United States Patent Office 3,080,339
Patented Mar. 5, 1963

3,080,339
THERMOPLASTIC COMPOSITIONS HAVING
IMPROVED LIGHT STABILITY
David A. Gordon, Midland, Mich., assignor to The Dow Chemical Company, Midland, Mich., a corporation of Delaware
No Drawing. Filed July 7, 1958, Ser. No. 746,680
1 Claim. (Cl. 260—45.85)

This invention relates to new and improved thermoplastic compositions. More particularly it relates to polymeric compositions having improved stability to the degradative effects of sunlight.

This application is a continuation-in-part of U.S. Serial No. 601,645, filed August 2, 1956, now abandoned.

Thermoplastic compositions, particularly those prepared from haloethylene polymers have found wide acceptance as useful materials for making foils, films, fibers, filaments and other articles. The articles so produced are inherently strong, dimensionally stable, relatively inert to common household solvents, and are easily colored for an attractive appearance. However, such articles are subject to rapid and severe degradation as evidenced by discoloration due to the effects of light. The problem becomes most serious when polymeric compositions are employed in filamentary articles in making window curtains, automobile seat covers, and other articles which are exposed for prolonged periods of time to direct sunlight. To overcome this disadvantage it has become commonplace to incorporate certain additives into the composition to stabilize it to the effects of light. Some of the prior light stabilizing materials have suffered from the disadvantages of bleeding out of articles fabricated from haloethylene polymers. Some of the materials are colored so that they impart an objectionable initial color preventing the preparation of white articles. Further, many of the prior materials lose their effectiveness as light stabilizers after exposure to sunlight for a short time. Still further the light stabilizers should be odorless, tasteless, non-toxic, non-volatile, and chemically inert to the polymer and additives forming the composition. In view of the many requirements and desirable characteristics of light stabilizers, it is impossible to predict the effectiveness of any given material as a light stabilizer.

It is accordingly an object of this invention to provide improved polymeric compositions having increased resistance to the degradative effects of light.

It is a particular object to provide such a composition which is based on a haloethylene polymer and is resistant to discoloration over prolonged periods of exposure to direct sunlight.

It is a further object to provide such a composition from which white and pastel colored articles may be prepared.

It is a still further object to provide such a composition using non-volatile and insoluble light stabilizing additives.

The above and related objects are achieved with a polymeric composition comprising a thermoplastic polymer and stabilizing quantities of amounts as will be later described of a benzenedicarboxylic acid diester having nonvicinal carboxyl groups and also having the general formula:

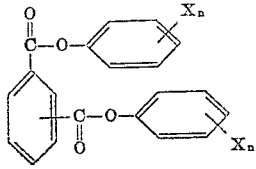

wherein X is selected from the group consisting of halogen, alkyl, alkoxy, aryl, and aryloxy and $n$ is a number of from 1 to 2. The compositions of this invention show effective resistance to the degradative effects of light even after prolonged exposure.

The useful diesters of this invention are those diesters within the scope of the above formula of isophthalic, or terephthalic acid. Representative of the useful compounds are:

Bis(p-tertiary octyl phenyl)isophthalate
Bis(p-tertiary octyl phenyl)terephthalate
Bis(p-chlorophenyl)isophthalate
Bis(p-dichlorophenyl)isophthalate
Bis(p-methylphenyl)isophthalate
Bis(p-isopropylphenyl)isophthalate
Bis(p-methoxyphenyl)terephthalate
Bis(biphenylyl)terephthalate
Bis(phenoxyphenyl)terephthalate
Bis(p-tert-amylphenyl)isophthalate
Bis(2,4-di-tert-butylphenyl)isophthalate
Bis(2,4-dimethylphenyl)terephthalate
Bis(3,5-dimethoxyphenyl)isophthalate The diesters are easily prepared by the known esterification procedures from the acid chlorides and phenol derivatives in the presence of pyridine or other esterification catalyst. Other esterification procedures are known.

Although a wide variety of thermoplastic materials may be stabilized in accordance with this invention, particularly advantageous results are obtained when haloethylene polymers, such as the polymers of vinyl chloride, the copolymers of vinyl chloride and vinylidene chloride, and the copolymers of vinylidene chloride with other copolymerizable cononomers such as vinyl acetate, acrylonitrile, ethyl acrylate and other alkyl acrylates, and ternary polymers of these monomers wherein the vinylidene chloride is present in an amount of at least 50 percent. Those haloethylene polymers are accordingly preferred in preparing the compositions. Haloethylene polymers present a difficult and unusual problem in that once degradation or discoloration has started the effect seems to be autocatalytic or at least accelerated.

The diesters of this invention are employed in a concentration of from 1 to 10 percent, preferably 2 to 5 percent, by weight based on the weight of the polymer. When less than 1 percent is used the compositions exhibit little more stability than unstabilized compositions. When more than 10 percent is employed no additional benefits result, the compositions are more costly to produce, and the physical properties, such as tensile strength of the composition based on the polymer may suffer.

The diesters of this invention are white, easily prepared, insoluble in aqueous alkali, and are non-volatile and consequently are excellent stabilizing materials for haloethylene polymers.

Most polymeric compositions comprise many ingredients such as plasticizers, fillers, pigments, and heat stabilizers, and the organic acid derivatives of this invention may be employed in the compositions in conjunction with such additives without any adverse effects. Likewise the derivatives of this invention may be used cooperatively with other known light stabilizers, ssch as salol.

The ingredients may be intermixed prior to fabrication either sequentially or simultaneously by known blending methods.

By way of example, sample compositions were prepared consisting essentially of about 88 parts by weight of a copolymer prepared from 85 percent by weight of vinylidene chloride and 15 percent by weight of vinyl chloride, 7 parts by weight of a pentaerythritol tetraester (ave. chain length of esterifying acid=6) sold commercially as Hercoflex 600 by the Hercules Powder Company, as a plasticizer, 0.5 part by weight of sodium tripolyphosphate, and 0.5 part of disodium lauryl phosphate as a heat stabilizer, 0.3 part by weight of citric acid as a color stabilizer, and 1 part of titanium dioxide as a pigment. One composition was left unstabilized as a blank; three compositions were stabilized with from 3 to 4 percent by weight of various diphthalates for comparison; and two compositions were stabilized with the diesters of this invention. Compression moldings 0.01 inch in thickness were prepared and exposed to ultraviolet sunlamps for 21 days after which they were examined visually for discoloration and rated according to an arbitrary scale wherein 1 is colorless and higher numbers indicate a corresponding increase in discoloration. The results are listed in Table I.

*Table I*

| Stabilizer—For Comparison | Percent Stabilizer | Color rating after (days) | | | |
|---|---|---|---|---|---|
| | | 1 | 7 | 14 | 21 |
| None | | 10 | 18 | 18 | 18 |
| Bis(p-chlorophenyl)phthalate | 3 | 6 | 12 | 14 | 14 |
| Bis(p-tert-butyl phenyl)phthalate | 4 | 9 | 13 | 16 | 16 |
| Bis(p-tert-octyl phenyl)phthalate | 3 | 6 | 12 | 14 | 14 |
| Compounds of This Invention: | | | | | |
| Bis(p-tert-octyl phenyl)isophthalate | 3 | 6 | 8 | 10 | 13 |
| Bis(p-tert-octyl phenyl)terephthalate | 3 | 2 | 3 | 5 | 9 |

Other compositions were prepared similar to the above except that 7 parts of tributyl aconitate were employed as a plasticizer in place of the pentaerythritol tetraester. After molding and exposure the compositions were rated as shown in Table II.

*Table II*

| Stabilizer—For Comparison | Percent Stabilizer | Color rating after (days) | | | |
|---|---|---|---|---|---|
| | | 1 | 6 | 12 | 24 |
| None | | 9 | 15 | 18 | 21 |
| Diresorcinol phthalate | 3 | 6 | 10 | 11 | 13 |
| Bis(m-benzoxyphenyl)phthalate | 3 | 6 | 10 | 11 | 12 |
| Compound of This Invention: | | | | | |
| Bis(p-chlorophenyl)isophthalate | 3 | 6 | 8 | 10 | 10 |

The same effective stabilization was exhibited by all of the compositions when they were exposed to direct sunlight in the State of Arizona for up to 750 ultra-violet sun hours. Additionally when the heat stability of the compositions was tested by standard testing procedures, the heat stability of the compositions of this invention was in all cases greater than that of the blank.

What is claimed is:

A light stable composition of matter comprising (1) a thermoplastic polymeric material composed essentially of vinylidene chloride and a complementary amount of a monoethylenically unsaturated comonomer; said polymer being normally subject to discoloration upon exposure to light and said composition also containing (2) from 1 to 10 percent by weight based on the weight of said polymeric material of bis(p-tert-octyl phenyl)terephthalate.

References Cited in the file of this patent

UNITED STATES PATENTS 2,157,068    Carruthers et al. _____ May 2, 1939